United States Patent
Ivens et al.

(10) Patent No.: US 7,086,383 B2
(45) Date of Patent: Aug. 8, 2006

(54) PERMANENT MAGNET DIGITAL PURGE VALVE

(75) Inventors: Kirk Ivens, Chatham (CA); Dale Zdravkovic, Mississuaga (CA); Russell Miles Modien, Chatham (CA)

(73) Assignee: Siemens VDO Automotive Inc., Chatham (CA)

(*) Notice: Subject to any disclaimer, the term of this patent is extended or adjusted under 35 U.S.C. 154(b) by 0 days.

(21) Appl. No.: 10/817,520

(22) Filed: Apr. 5, 2004

(65) Prior Publication Data

US 2004/0255916 A1   Dec. 23, 2004

Related U.S. Application Data

(60) Provisional application No. 60/460,382, filed on Apr. 4, 2003.

(51) Int. Cl.
*F02M 37/04* (2006.01)
(52) U.S. Cl. ...................... 123/458; 123/516
(58) Field of Classification Search ............... 123/520, 123/521, 519, 518, 516, 458; 251/129.21, 251/129.22, 129.18, 129.15, 129.08, 129.05
See application file for complete search history.

(56) References Cited

U.S. PATENT DOCUMENTS

| | | | |
|---|---|---|---|
| 2,637,343 A | 5/1953 | Matthews | |
| 4,275,697 A | 6/1981 | Stoltman | |
| 4,306,589 A | 12/1981 | Harned et al. | |
| 4,366,944 A | 1/1983 | Kah, Jr. | |
| 4,392,632 A | 7/1983 | Gast et al. | |
| 4,564,046 A * | 1/1986 | Lungu | 137/625.65 |
| 5,188,336 A | 2/1993 | Graner et al. | |
| 5,413,082 A * | 5/1995 | Cook et al. | 123/520 |
| 5,630,403 A | 5/1997 | Van Kempen et al. | |
| 5,967,487 A | 10/1999 | Cook et al. | |
| 6,000,417 A | 12/1999 | Jacobs | |
| 6,003,839 A | 12/1999 | Kobayashi | |
| 6,068,010 A * | 5/2000 | Reinicke | 137/1 |
| 6,149,126 A | 11/2000 | Krimmer et al. | |
| 6,415,817 B1 | 7/2002 | Krimmer et al. | |
| 6,517,045 B1 | 2/2003 | Northedge | |

* cited by examiner

*Primary Examiner*—Carl S. Miller

(57) ABSTRACT

A purge valve is in fluid communication between a fuel vapor collection canister and an intake manifold of an internal combustion engine. The purge valve includes a body, a seat, a head, and a solenoid. The body defines a fuel vapor flow path between a first port is in fluid communication with the fuel vapor collection canister, and a second port is in fluid communication with the intake manifold. The seat defines an aperture through which the fluid flow passes in an open configuration of the purge valve. The head includes a permanent magnet, and is attracted to the seat and occludes the aperture in a closed configuration of the purge valve. The solenoid repels the head toward the open configuration when the solenoid is energized, and the head occludes the aperture due to the magnetic attraction with the seat when the solenoid is de-energized.

8 Claims, 3 Drawing Sheets

PERMANENT MAGNET DIGITAL PURGE VALVE

CROSS REFERENCE TO RELATED APPLICATIONS

This application claims the benefit of the earlier filing date of U.S. Provisional Application No. 60/460,382, filed Apr. 4, 2003, which is incorporated by reference herein in its entirety.

FIELD OF THE INVENTION

This invention relates generally to emission control valves for automotive vehicles. In one specific aspect, the invention relates to solenoid-operated fluid valves for purging volatile fuel vapors from fuel tanks and vapor storage canisters to internal combustion engines that power such vehicles.

BACKGROUND OF THE INVENTION

A known on-board evaporative emission control system includes a fuel vapor collection canister, which collects volatile fuel vapors from the headspace of the fuel tank, and a canister purge solenoid (CPS) valve for periodically purging collected vapors to an intake manifold of the engine. The CPS valve comprises a solenoid actuator that is under the control of a microprocessor-based engine management system.

Fuel vapors from the tank flow through the vapor line and is stored in the vapor canister. The vapor canister is a storage medium for the hydrocarbon fuel vapors and is filled with carbon which has a natural affinity for hydrocarbons. During vehicle operation, atmospheric air is drawn in through the canister vent and the hydrocarbon vapors are introduced into the engine intake manifold and are mixed with the fuel-air mixture and are burnt in the engine A known CPS valve includes a movable valve element that is resiliently biased by a compression spring against a valve seat to close the valve to flow when no electric current is being delivered to the solenoid. As electric current is increasingly applied to the solenoid, an increasing electromagnetic force acts in a sense tending to unseat the valve element and thereby open the valve to fluid flow. This electromagnetic force must overcome various forces acting on the mechanical mechanism to unseat the valve element, including overcoming the opposing spring bias force.

Thus, in a know CPS valve, the solenoid must provide sufficient actuating force not only to open the valve, but also to overcome the opposing spring bias force. Further, the solenoid acts against the force of the flow through the valve, which must also be overcome.

Accordingly, a need exists for further improvement in certain aspects of CPS valves.

SUMMARY OF THE INVENTION

The present invention provides a purge valve in fluid communication between a fuel vapor collection canister and an intake manifold of an internal combustion engine. The purge valve includes a body, a seat, a head, and a solenoid. The body defines a fuel vapor flow path between first and second ports. The first port is in fluid communication with the fuel vapor collection canister, and the second port is in fluid communication with the intake manifold. The seat defines an aperture through which the fluid flow passes in an open configuration of the purge valve. The head includes a permanent magnet, and is attracted to the seat and occludes the aperture in a closed configuration of the purge valve. And the solenoid is magnetically coupled to the head. The head is repelled by the solenoid toward the open configuration when the solenoid is energized, and the head occludes the aperture due to the magnetic attraction with the seat when the solenoid is de-energized.

The present invention also provides a fluid flow valve that includes a body, a seat, a head, and an electromagnet. The body defines a fluid flow path between an inlet port and an outlet port. The seat defines an aperture through which the fluid flow passes in an open configuration of the fluid flow valve. The head includes a permanent magnetic and occludes the aperture in a closed configuration of the fluid flow valve. The permanent magnet being attracted to the seat and biasing the head toward the closed configuration of the fluid flow valve. The electromagnet is magnetically coupled to the head, and repels the head toward the open configuration when the electromagnet is energized. The magnetic attraction of the permanent magnet to the seat occludes the aperture when the electromagnet is de-energized.

The present invention also provides a method of controlling fuel vapor communication between a fuel vapor collection canister and an intake manifold of an internal combustion engine. The method includes preventing the fuel vapor communication due to a permanent magnet being attracted to a seat, and permitting the fuel vapor communication through the aperture due to an electromagnet repelling the permanent magnet from the seat. The seat defines an aperture through which fuel vapor passes, and the permanent magnet occludes the aperture.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
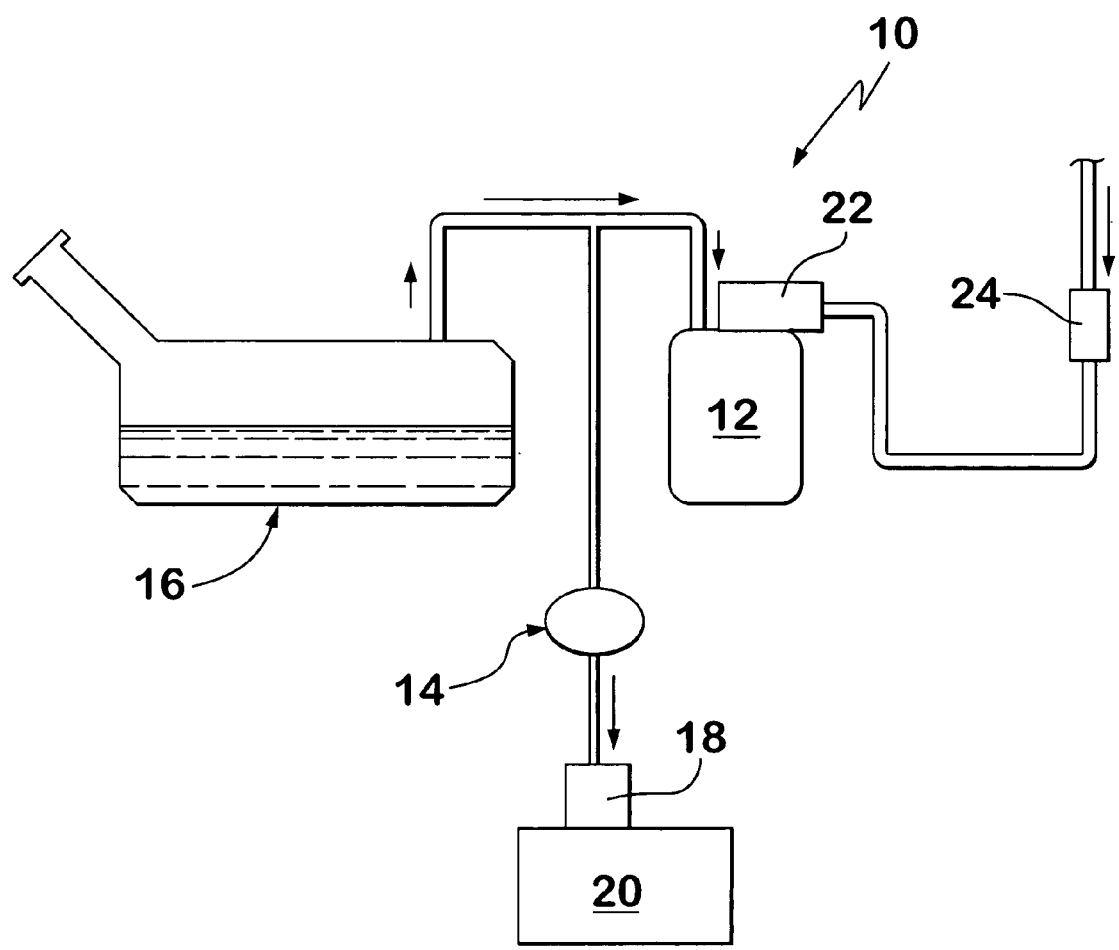
FIG. 1 is a schematic illustration showing an automotive evaporation system including a purge valve in accordance with a preferred embodiment of the present invention.

FIG. 1 shows an evaporative emission control system 10 of a motor vehicle comprising a fuel vapor collection canister (e.g., a carbon canister) 12 and a canister purge solenoid (CPS) valve 14 connected in series between a fuel tank 16 and an intake manifold 18 of an internal combustion engine 20 in a known fashion. A fuel vapor pressure management system 22 is in fluid communication between the fuel vapor collection canister 12 and ambient atmospheric conditions via a filter 24

Figure 2:
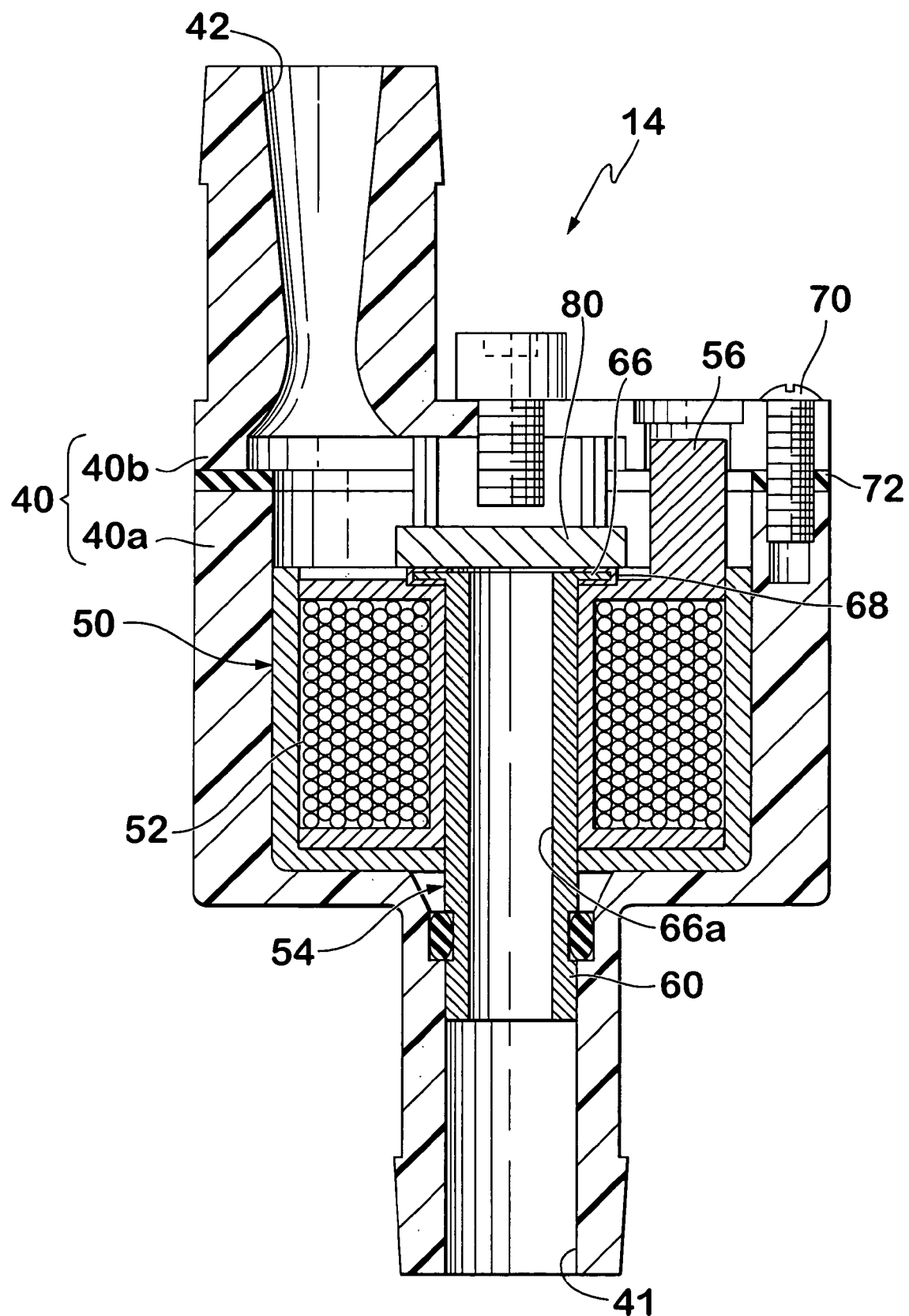
FIG. 2 is a cross-section view of the purge valve, as shown in FIG. 1, in a closed configuration.
Figure 3:
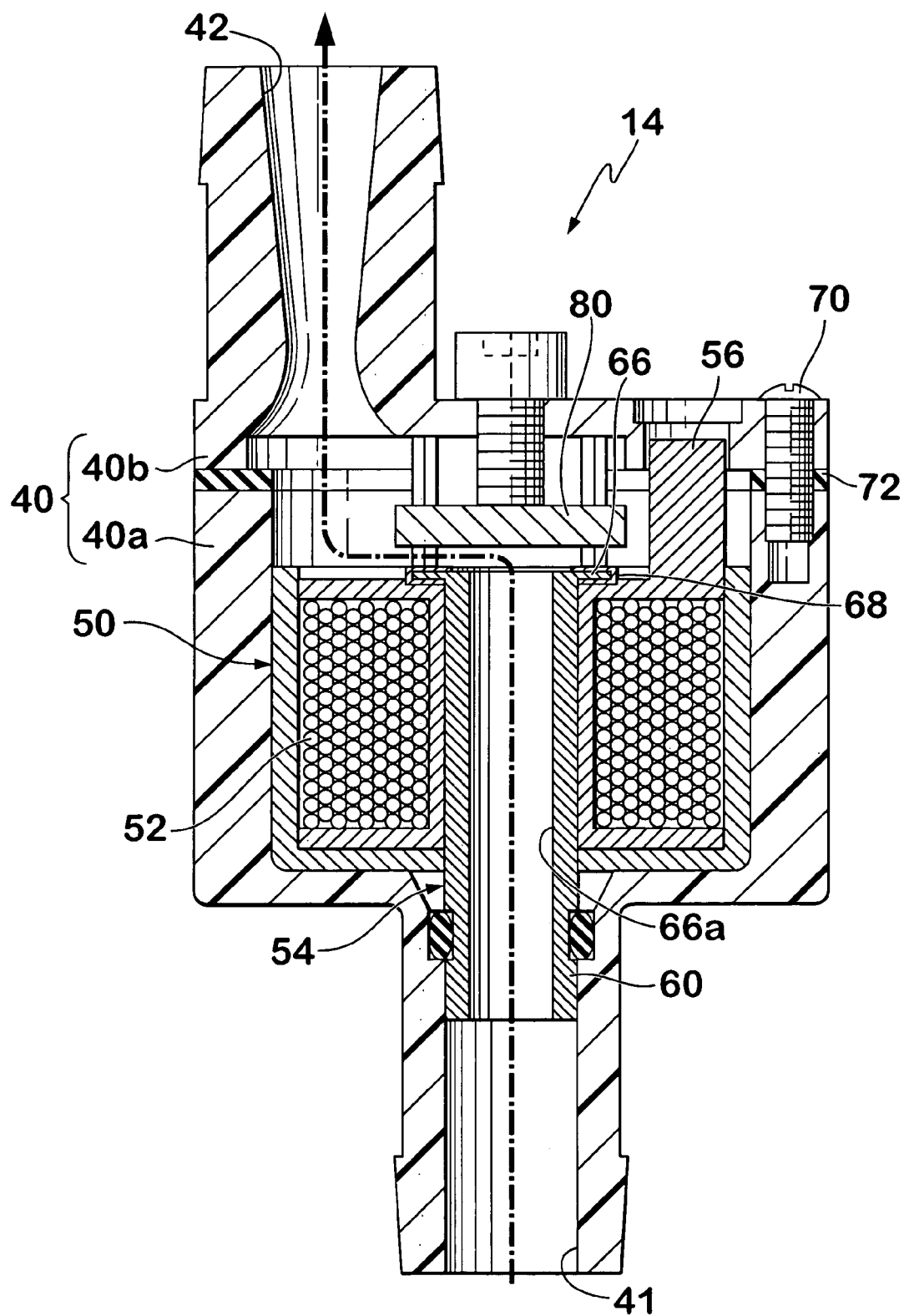
FIG. 3 is a cross-section view of the purge valve, as shown in FIG. 1, in an open configuration.

Referring additionally to FIGS. 2 and 3, the CPS valve 14 includes a housing 40 that defines an inlet port 41 and an outlet port 42. Preferably, the housing 40 includes a body 40a that receives the electromagnetic components of the CPS valve 14 and also includes a cap 40b that is cooperatively coupled to the body 40a. Of course, the housing 40 can be composed of different numbers and arrangements of pieces. The inlet port 41 is in fluid communication with the fuel vapor collection canister 12 and the outlet port 42 is in fluid communication with the intake manifold 18 of the internal combustion engine 20.

As shown in the exemplary embodiment, the body 40a receives an electromagnetic solenoid 50 including a coil assembly 52 and a stator 54. Electrical leads 56 for the coil assembly 52 can extend, for example, out through the cap 40b. The stator 54 includes a tubular portion 60 and an annular disc portion 66. The tubular portion 60 has an upstream end 62 that is sealing engaged with the inlet port 41 of the body 40a. This ensures that all fuel vapor flow through the inlet port 41 also passes through the tubular portion 60.

The annular disc portion 66 is fixed to the downstream end 64 of the tubular portion 60. Preferably, the tubular and annular disc portions 60,66 are integrally formed of a single homogenous piece of ferrous material. The annular disc portion 66 defines an aperture 66a, and may also including a sealing element 68 as will be discussed further hereinafter.

The outlet port 42 portion of the cap 40b may include a sonic nozzle configuration so as to maintain a constant (or sonic) mass flow regardless of changes in vacuum level at the intake manifold 18, down to 23 kiloPascals of differential vacuum. The cap 40b may be secured to the body 40a by any conventional manner, such as by one or more fasteners 70. A gasket 72 may be interposed between the body 40a and the cap 40b to ensure that the housing 40 is leak-proof.

A disc 80 is movable with respect to the annular disc portion 66. In an open configuration of the CPS valve 14 as shown in FIG. 3, fuel vapor flow is permitted from the first port 40 to the second port 42 via the tubular portion 60 and the aperture 66a by virtue of the disc 80 being spaced from the annular disc portion 66. In a closed configuration of the CPS valve 14 (as shown in FIG. 2), fuel vapor flow is prevented from the first port 40 to the second port 42 by virtue of the disc 80 occluding the aperture 66a.

The disc 80 includes a permanent magnet that is magnetically attracted to the annular disc portion 66 in the closed configuration of the CPS valve 14. To move the disc 80 from the closed configuration to the open configuration of the CPR valve 14, an electric current is supplied to the coil assembly 52 via the electrical leads 56. The electric current in the coil assembly 52 develops a magnetic field that magnetizes the stator 54 with an opposite pole to that of the permanent magnet. This repels the disc 80 towards the open configuration of the CPS valve 14. When the current supply is disconnected from the coil assembly 52, the magnetic field collapses and the attraction of the permanent magnet to the annular disc portion 66 results in the disc 80 again occluding the aperture 66a. The aforementioned sealing element 68 may be interposed between the annular disc portion 66 and the disc 80 to ensure a leak-proof seal.

Other than the repulsive force exerted on the disc 80 by the magnet field, the only other force acting to move the disc 80 to the open configuration of the CPS valve 14 is the flow of fuel vapors through the gap between the disc 80. Thus, the flow of fuel vapors that occurs in the open configuration of the CPS valve 14 augments the magnetic force of the magnetic field that is developed by the coil assembly 52.

Of the other ancillary forces acting on the disc 80, e.g., gravity, there is not any kind of resilient biasing force, such as would be applied by a spring, for example, acting on the disc 80. Thus, operation of the CPS valve 14 is independent of the possibility of reduced performance or failure of a conventional resilient biasing element. Further, the permanent magnet provides a fail-safe arrangement whereby the CPS valve 14 assumes the closed configurations in the absence of an activating signal being supplied to the CPS valve 14.

There are a number of advantages according to the present invention. For example, the CPS valve 14 is in a normally closed position to prevent migration of fuel vapors from the canister 12 into the intake manifold 18 when the valve 14 is not energized. When the CPS valve 14 is energized, the magnetic field that is produced by the coil assembly 52 repels the permanent magnet armature disc 80. The armature disc 80 separates from the valve seat, e.g., the annular disc portion 66, and fuel vapor will flow from the canister inlet port 41, through that aperture 66a, to the manifold outlet port 42. A unique feature of the CPS valve 14 is that the flow of vapor through the valve 14 assists in separating the permanent magnet disc 80 from the valve seat, thereby resulting in improved low-end control.

When the CPS valve 14 is de-energized, the valve will close due to the attraction of the permanent magnet disc 80 to the stator 54. This will seal the manifold outlet port 42 from the canister inlet port 41. Using the magnetic attraction to seal the valve shut eliminates the need for an external spring resiliently biasing the disc 80.

In the closed position (FIG. 2) magnetic attraction between the permanent magnet disc 80 and the stator 54 will hold the magnet disc 80 to the stator 54, thereby occluding the aperture 66a and sealing the CPS valve 14 in the closed configuration. When the coil assembly 52 is energized, the magnetic latching force is overcome and the disc 80 is repelled to the open position (FIG. 3). Fuel vapor flow is then permitted from the canister inlet port 41 to the manifold outlet port 42.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A purge valve in fluid communication between a fuel vapor collection canister and an intake manifold of an internal combustion engine, the purge valve comprising:
   a body defining a fuel vapor flow path between first and second ports, the first port being in fluid communication with the fuel vapor collection canister, and the second port being in fluid communication with the intake manifold;
   a seat defining an aperture through which fuel vapor flow passes in an open configuration of the purge valve, and fluid communication between the aperture and the intake manifold being prevented in a closed configuration of the purge valve;
   a head including a permanent magnet, the head being attracted to the seat and occluding the aperture in the closed configuration of the purge valve; and
   a solenoid being magnetically coupled to the head, the head being repelled by the solenoid toward the open configuration when the solenoid is energized, and the head occluding the aperture due to the magnetic attraction with the seat when the solenoid is de-energized.

2. The purge valve according to claim 1, wherein the solenoid comprises a stator including a passage through which the fuel vapor flow path passes in the open configuration of the purge valve.

3. The purge valve according to claim 2, wherein the stator comprises the seat.

4. The purge valve regulator according to claim 3, wherein the stator comprises a tube portion and a disc portion fixed to the tube portion, the tube portion defines the passage, and the disc portion defines the aperture.

5. The purge valve regulator according to claim 4, wherein the disc portion is integrally formed at a downstream end of the tube portion that is proximate the second port.

6. The purge valve according to claim 2, wherein the passage extends along an axis, the first port is concentrically aligned with the axis, and the second port is offset from the axis.

7. The purge valve according to claim 1, further comprising:

sonic nozzle defining a portion of the fuel vapor flow path between the aperture and the second port, the sonic nozzle maintaining a substantially constant mass flow in the open configuration regardless of vacuum changes in the intake manifold.

8. The purge valve according to claim 1, wherein movement of the head between the open and closed configurations excludes resilient biasing.

* * * * *